H. M. LAMBERT.
CUSHION TIRE FOR VEHICLE WHEELS.
APPLICATION FILED SEPT. 11, 1916.
1,268,078. Patented May 28, 1918.
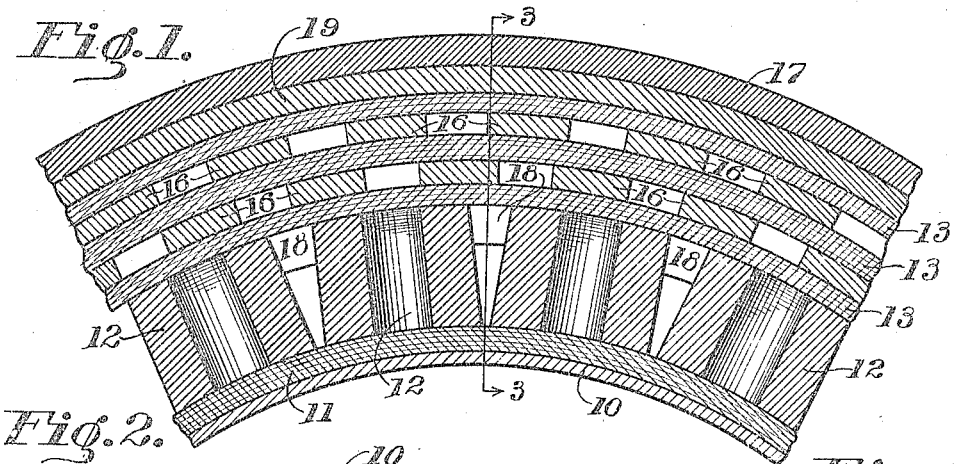
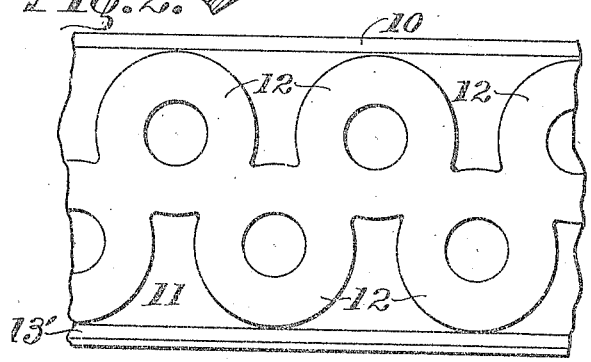
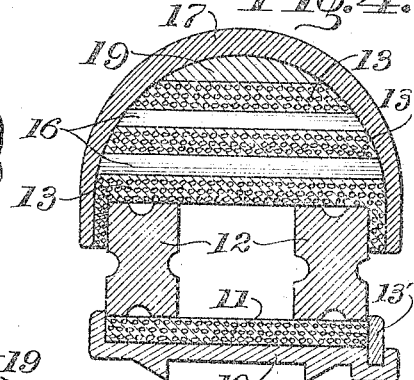
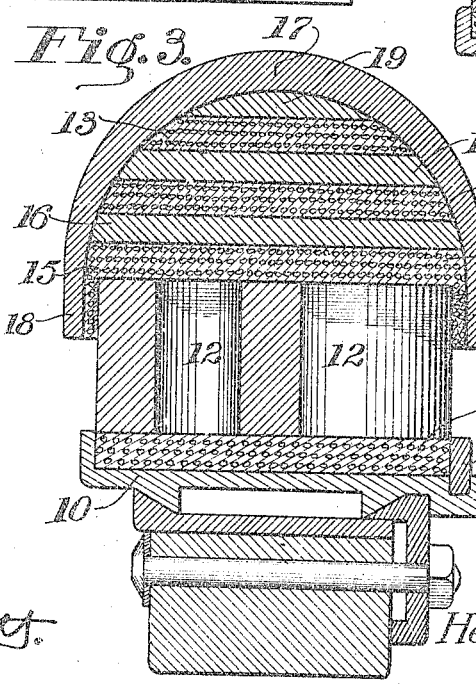
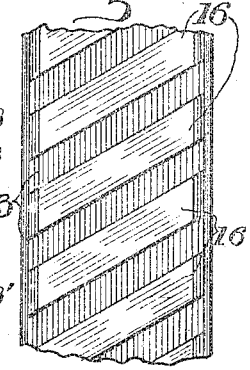
WITNESSES:
INVENTOR
Henry M. Lambert
BY Strong & Townsend
ATTORNEYS

UNITED STATES PATENT OFFICE.

HENRY M. LAMBERT, OF PORTLAND, OREGON, ASSIGNOR TO LAMBERT MULTIPLUS CO., OF PHOENIX, ARIZONA, A CORPORATION OF ARIZONA.

CUSHION-TIRE FOR VEHICLE-WHEELS.

1,268,078.  Specification of Letters Patent.  Patented May 28, 1918.

Application filed September 11, 1916. Serial No. 119,437.

*To all whom it may concern:*

Be it known that I, HENRY M. LAMBERT, a citizen of the United States, residing at Portland, in the county of Multnomah and State of Oregon, have invented new and useful Improvements in Cushion-Tires for Vehicle-Wheels, of which the following is a specification.

My invention relates to cushion tires; and has for its object to simplify and improve the construction and operation of the same.

In carrying out this object, I employ a series of non-stretchable, flexible, circumferential belts, concentrically arranged and spaced apart and provided intermediately with flexible, non-compressible fillers, the belts and fillers being preferably bonded together to form an integral detachable tire, and yielding supporting means between the tire and wheel rim, formed of rubber blocks of improved and simplified construction, to give the desired degree of resiliency to the tire.

A form which my invention may assume is exemplified in the following description and illustrated in the accompanying drawings, in which—

Figure 1 shows a circumferential section of a portion of a vehicle tire embodying my invention.

Fig. 2 shows a plan view of a portion of a tire, illustrating the rubber supporting blocks for the cushion tire.

Fig. 3 shows a cross sectional view of the tire, taken on the line 3—3 of Fig. 1.

Fig. 4 shows a detail of a tire, illustrating a modified form of the rubber supporting blocks.

Fig. 5 shows a detail sectional view of the non-stretchable belt employed in my device.

Fig. 6 shows a plan view of a portion of one of the stretchless belts with fillers applied thereto obliquely.

Referring more in detail to the form of my invention illustrated in the drawings, a demountable wheel rim 10 is provided with a detachable belt 11 carrying yielding supports, in the form of hollow rubber blocks 12, each stood on end and arranged preferably, in alternate or staggered relation, as shown in Fig. 2, and cemented or vulcanized thereon, said belt being held in place by a removable flange 13' on the rim forming a channel therewith. If desired, the series of separate blocks may be vulcanized together at their tangential sides, or a continuous supporting member of rubber at opposite sides and spaced apart, as shown in Fig. 4, may be employed instead.

Circumferentially mounted upon the resilient supports 12 is a tire, which consists of a plurality of concentrically arranged and spaced belts or bands 13, which are preferably so constructed as to be substantially non-stretchable and inelastic.

This form of belt I construct with a base or primary sheet or strip of canvas, or other suitable flexible material, which, during the formation of the belt, is stretched to its limit of elasticity, and upon this stretched base or foundation 14 is wound, under a suitable degree of tension, one layer of a cord 15; the cord and the foundation layer being suitably bonded, as by vulcanization. Upon the first layer of the cord is laid another winding or layer of fabric, this being vulcanized to the first, and so on until as many concentric laminæ of fabric strips and coils of cord are so arranged as to produce an endless belt 13 of the desired thickness.

The endless, non-stretchable, but flexible and substantially non-compressible, belts 13 are shown as spaced in the tire by transversely extending, obliquely arranged, circumferentially spaced fillers or blocks 16, of suitable width and thickness, the length of which is substantially equal to the width of the belts 13; the fillers or blocks 16 being spaced circumferentially and pitched about equal to their width. I prefer to use the blocks or spacers 16 of the tire of such a character that they are substantially non-compressible and non-elastic but flexible, and preferably are joined to their adjacent concentric belts as by vulcanization, so as to form a substantially integral tire structure.

For protecting the outer belt or band 13 from wearing contact with the roadway surface, I may cover the same with an exterior tread of rubber or other suitable material 17, which may be brought down over the sides and extended to form flanges 18, thus bonding the spaced belts and intermediate fillers into a composite tire structure. The flanges 18 are preferably vulcanized to the rubber supporting blocks 12, and the inner belt 13 of the tire may also be vulcanized to said blocks for the purpose of better securing the tire and blocks in position upon the wheel. A suitable breaker strip 19 may be employed in connection with the rubber tread.

In my tire I employ, preferably, three bands, the cords of which are tested to determine their tensile strength and then laid under maximum tension so as to completely remove further stretching. There is then no further give in the finished belts and danger of their becoming loose and flabby is entirely eliminated. The fillers between the belts are made flexible in order that they may adjust themselves to inequalities in the surface of the roadway and are non-compressible to avoid flattening of the tire and resultant loss of power. By arranging these fillers obliquely on the belts I am enabled to derive greater tensile strength from the tire than would be possible if the fillers were at right angles to the belts.

This tire, in respect to its operation, when meeting both small and large obstacles simulates the action of a pneumatic tire. The first phase of this operation, which is obtained in pneumatic tires by the instantaneous yielding of the tire at the point of impact, I accomplish by reason of the fact that the belts and fillers will flex to a certain degree to accommodate slight obstructions, such as small stones and lumps, in the roadway and instantly spring back to place under the vibratory influence of the tensional cords in the belts. The second phase of the operation, namely, that in connection with meeting large obstacles which is obtained in pneumatic tires through the compression of the air in the tire around the entire wheel, I accomplish by the provision of the yielding supports 12 between the tire and the wheel rim. Thus a large obstruction will cause inward bending of the tire at the point of contact and all of the rubber supporting blocks are caused to be compressed at once, owing to the non-stretchable character of the belts, and thus the rim of the wheel is reinforced at all points throughout its circumference and is protected against breakage.

The rubber blocks 12 I find provide sufficient resiliency for this purpose and are much more durable and lasting than springs. By making them hollow I increase their resiliency and lessen their weight without, at the same time, interfering with their strength. Furthermore, the heat generated when the tire is in operation is more quickly radiated where the blocks are made hollow than otherwise.

Many changes in the construction and arrangement of the several parts of my device may be employed without departing from the spirit of my invention as disclosed in the appended claims.

Having thus described my invention what I claim and desire to secure by Letters Patent is—

1. The combination with a wheel having a rigid rim, of a cushion tire therefor comprising a flexible, but in itself substantially non-compressible, superstructure formed in part of circumferential fabric belts stretched to their approximate limit of elongation and a yielding support between the superstructure and the wheel rim comprising a fabric base secured to the wheel rim and rubber cushioning devices vulcanized to said base and to the superstructure.

2. The combination with a wheel having a rigid rim, of a cushion tire consisting of a superstructure embodying a plurality of concentrically spaced, non-stretchable, flexible, endless belts, separated by circumferentially and symmetrically spaced, non-compressible, flexible fillers, a circumferential fabric base to fit the wheel rim and spaced apart from the inner belt of the superstructure, and rubber cushioning devices between the base and inner belt, the whole being integrally bonded.

3. The combination with a wheel having a rigid rim, of a cushion tire consisting of a superstructure embodying a plurality of concentrically spaced, non-stretchable, flexible, endless belts, separated by circumferentially and symmetrically spaced, non-compressible, flexible fillers, a circumferential fabric base to fit the wheel rim and spaced apart from the inner belt of the superstructure, and rubber cushioning devices between the base and inner belt, the whole being integrally bonded, the circumferential edges of the inner belt of said superstructure being turned to engage the sides of the cushioning devices.

In testimony whereof I have hereunto set my hand in the presence of two subscribing witnesses.

HENRY M. LAMBERT.

Witnesses:
D. G. WOODWARD,
B. W. COOPER.